(12) United States Patent
Higuchi et al.

(10) Patent No.: US 7,189,786 B2
(45) Date of Patent: Mar. 13, 2007

(54) GOLF BALL

(75) Inventors: Hiroshi Higuchi, Chichibu (JP); Atsushi Nanba, Chichibu (JP); Nobuyuki Kataoka, Chichibu (JP); Hiroto Sasaki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 219 days.

(21) Appl. No.: 10/929,557

(22) Filed: Aug. 31, 2004

(65) Prior Publication Data

US 2006/0047082 A1    Mar. 2, 2006

(51) Int. Cl.
  *A63B 37/00*   (2006.01)
  *A63B 37/06*   (2006.01)
  *C08L 9/00*    (2006.01)

(52) U.S. Cl. .................. 525/193; 525/236; 473/371; 473/372

(58) Field of Classification Search .............. None
See application file for complete search history.

(56) References Cited

U.S. PATENT DOCUMENTS

| | | | |
|---|---|---|---|
| 4,546,980 A | 10/1985 | Gendreau et al. | |
| 4,683,257 A | 7/1987 | Kakiuchi et al. | |
| 4,770,422 A | 9/1988 | Isaac | |
| 4,929,678 A | 5/1990 | Hamada et al. | |
| 4,955,613 A | 9/1990 | Gendreau et al. | |
| 5,082,285 A | 1/1992 | Hamada et al. | |
| 6,194,505 B1 | 2/2001 | Sone et al. | |
| 6,312,346 B1 | 11/2001 | Sugimoto | |
| 6,652,393 B1 * | 11/2003 | Watanabe | 473/377 |

FOREIGN PATENT DOCUMENTS

| | | | |
|---|---|---|---|
| JP | 61-71070 A | 4/1986 | |
| JP | 62-89750 A | 4/1987 | |
| JP | 62-112574 A | 5/1987 | |
| JP | 63-275356 A | 11/1988 | |
| JP | 2-268778 A | 11/1990 | |
| JP | 3-151985 A | 6/1991 | |
| JP | 7-268132 A | 10/1995 | |
| JP | 11-35633 A | 2/1999 | |
| JP | 11-70187 A | 3/1999 | |
| JP | 11-164912 A | 6/1999 | |
| JP | 11-319148 A | 11/1999 | |
| JP | 2001-149505 A | 6/2001 | |
| JP | 2001-149507 A | 6/2001 | |
| JP | 2002-293996 A | 10/2002 | |
| JP | 2004180720 | * | 7/2004 |

OTHER PUBLICATIONS

Mark R. Mason et al.; "Hydrolysis of Tri-*tert*-butylaluminum: The First Structural Characterization of Alkylalunoxanes $[(R_2Al)_2O]_n$ and $(RAlO)_n$,"; J. Am. Chem. Soc. 1993, 115; pp. 4971-4984.

C. Jeff Harlan; "Three-Coordinate Aluminum Is Not a Prerequisite for Catalytic Activity in the Zirconocene—Alumoxane Polymerization of Ethylene"; J. Am. Chem. Soc. 1995, E, 117; pp. 6465-6474.

"Reaction Mechanisms in Metallocene Catalyzed Olefin Polymerization"; Report of Research & Development, vol. 23, No. 9; 1994; pp. 5-15.

* cited by examiner

*Primary Examiner*—David J. Buttner
(74) *Attorney, Agent, or Firm*—Sughrue Mion, PLLC

(57) ABSTRACT

A golf ball which is formed from a crosslinked rubber compound composed of, as essential components, (A) a rubber base material composed of (a) a polybutadiene containing no less than 60 wt % of cis-1,4 bonds and having a Mooney viscosity ($ML_{1+4}$ (100° C.)) of 50 to 120, which is synthesized by using a group VIII catalyst element and/or a rare earth element-based catalyst, and (b) a solid isoprene rubber containing no less than 60 wt % of cis-1,4 bonds and having a Mooney viscosity ($ML_{1+4}$ (100° C.)) of 70 to 90, with the ratio of (a) to (b) being from 96/4 to 99/1 by weight; (B) an unsaturated carboxylic acid and/or a metal salt thereof; and (C) an organic peroxide. The golf ball is characterized by good rebound resilience and good workability with which it is produced.

6 Claims, No Drawings

GOLF BALL

BACKGROUND OF THE INVENTION

The present invention relates to a golf ball characterized by good rebound resilience and good workability with which it is produced.

In an attempt to impart good rebound resilience to golf balls, various improvements have been made on the formulation of polybutadiene as a base material for golf balls.

Among such improvements is a new rubber compound for solid balls which was disclosed in Japanese Patent Laid-open No. Sho 62-89750, for example. This rubber compound is composed of a polybutadiene (as the base material) having a Mooney viscosity of 70 to 100, which is synthesized by using a nickel or cobalt catalyst, and another polybutadiene having a Mooney viscosity of 30 to 90, which is synthesized by using a lanthanum-based catalyst, or another polybutadiene having a Mooney viscosity of 20 to 50, which is synthesized by using a nickel or cobalt catalyst. However, the rubber compound mentioned above still needs further improvements on extrusion workability and rebound resilience.

Also, there is disclosed in Japanese Patent Laid-open No. Hei 2-268778 a golf ball which is molded from a blend of a polybutadiene having a Mooney viscosity less than 50, which is synthesized by using a group VIII element catalyst, and another polybutadiene having a Mooney viscosity less than 50, which is synthesized by using a lanthanide catalyst. This golf ball, however, is poor in rebound resilience.

Moreover, there is disclosed in Japanese Patent Laid-open No. Hei 11-70187 a multi-piece solid golf ball having an intermediate layer formed from a polybutadiene having a low Mooney viscosity. There is disclosed in Japanese Patent Laid-open No. Hei 11-319148 a solid golf ball formed from a rubber compound composed of a polybutadiene having a Mooney viscosity of 50 to 69, which is synthesized by using a nickel or cobalt catalyst, and another polybutadiene having a Mooney viscosity of 20 to 90, which is synthesized by using a lanthanoid-based catalyst. There is disclosed in Japanese Patent Laid-open No. Hei 11-164912 a solid golf ball formed from a rubber compound which contains no more than 2.0% of 1,2-vinyl bond and has an Mw/Mn ratio no larger than 3.5 (which is a ratio of weight-average molecular weight to number-average molecular weight). There is disclosed in Japanese Patent Laid-open No. Sho 63-275356 a golf ball which is formed from a rubber compound containing a polybutadiene having a high Mooney viscosity. There is disclosed in Japanese Patent Laid-open No. Hei 3-151985 a golf ball which is formed from a rubber compound composed of two kinds of polybutadiene, one having a high number-average molecular weight and the other having a low number-average molecular weight. However, the disclosed rubber compounds are all poor in extrusion workability and they merely give golf balls poor in rebound resilience.

Also, there is disclosed in Japanese Patent Laid-open No. Hei 6-190083 a blend composed of a polybutadiene having a high Mooney viscosity and an isoprene rubber having a high Mooney viscosity. This blend, however, is not necessarily satisfactory in workability and rebound resilience. There is disclosed in Japanese Patent Laid-open No. Sho 60-94434 a polybutadiene compounded with zinc acrylate, zinc methacrylate, and isoprene rubber in a specific ratio. This compound, however, is not satisfactory in rebound resilience because the polybutadiene has a low Mooney viscosity. A similar rubber compound is disclosed in Japanese Patent Laid-open No. Hei 4-109971; however, it is still poor in rebound resilience because the polybutadiene has a low Mooney viscosity. Incidentally, Japanese Patent Laid-open No. Hei 2-297384 discloses a fact that rebound resilience is improved by addition of an organosulfur compound or a metal containing organosulfur compound.

SUMMARY OF THE INVENTION

The present invention was completed in view of the foregoing. It is an object of the present invention to provide a golf ball characterized by good rebound resilience and good workability (extrudability) with which it is produced.

In order to achieve the above-mentioned object, the present inventors carried out zealous researches, which led to the following finding. A polybutadiene having a high Mooney viscosity and a high average molecular weight is good in rebound resilience but is poor in workability (or extrudability). On the other hand, a polybutadiene having a low Mooney viscosity and a broad molecular weight distribution is good in workability (or extrudability) but is not satisfactory in rebound resilience when used for a golf ball core. A polybutadiene containing no less than 60 wt % of cis-1,4 bond and having a Mooney viscosity ($ML_{1+4}$ (100° C.)) of 50 to 120, which is synthesized by using a group VIII element catalyst and/or a rare earth element-based catalyst, is very good in rebound resilience but is poor in workability. However, if this polybutadiene is compounded in a specific ratio with a solid isoprene rubber containing no less than 60 wt % of cis-1,4 bonds and having a Mooney viscosity ($ML_{1+4}$ (100° C.)) of 70 to 90, the resulting blend exhibits improved workability (particularly extrudability) while retaining good rebound resilience and suppressing cold flow. The present invention is based on the finding mentioned above.

The present invention is directed to a golf ball defined in the following.

[1] A golf ball which is formed from a crosslinked rubber compound composed of, as essential components, (A) a rubber base material composed of (a) a polybutadiene containing no less than 60 wt % of cis-1,4 bonds and having a Mooney viscosity ($ML_{1+4}$ (100° C.)) of 50 to 120, which is synthesized by using a group VIII element catalyst and/or a rare earth element-based catalyst, and (b) a solid isoprene rubber containing no less than 60 wt % of cis-1,4 bonds and having a Mooney viscosity ($ML_{1+4}$ (100° C.)) of 70 to 90, with the ratio of (a) to (b) being from 96/4 to 99/1 by weight;

(B) an unsaturated carboxylic acid and/or a metal salt thereof; and (C) an organic peroxide.

[2] A golf ball of [1], wherein the polybutadiene has a molecular weight distribution Mw/Mn of 2.0 to 8.0, where Mw denotes a weight-average molecular weight and Mn denotes a number-average molecular weight.

[3] A golf ball of [1], wherein the polybutadiene has a solution viscosity η (mPa.s) of 300 to 1000 measured for a 5 wt % toluene solution at 25° C.

[4] A golf ball of [1], wherein the rubber compound additionally contains 0.1 to 5 parts by weight of an organosulfur compound for 100 parts by weight of the rubber base material.

[5] A golf ball of [1], wherein the organic peroxide is composed of two or more species of organic peroxides which are specified by their half-life such that the ratio of $d_t/c_t$ is 7 to 20, where $c_t$ denotes the half-life of an organic peroxide (c) having the shortest half-life and $d_t$ denotes the half-life of an organic peroxide (d) having the longest half-life, with the total amount of these organic peroxides being 0.1 to 5 parts by weight for 100 parts by weight of the rubber base material.

[6] A golf ball of [1], which is a one-piece solid golf ball or a golf ball having a solid core or a solid center, wherein the crosslinked product of the rubber compound constitutes the one-piece solid golf ball or the solid core or solid center, and the one-piece solid golf ball or the solid core or solid center undergoes a deflection of 2.0 to 6.0 mm under a load of 980 N (100 kg).

DETAILED DESCRIPTION OF THE INVENTION

The invention will be described in more detail in the following.

The golf ball according to the present invention is formed from a specific crosslinked rubber compound which is composed of, as essential components, (A) a rubber base material composed of (a) a polybutadiene containing no less than 60 wt % of cis-1,4 bonds and having a Mooney viscosity ($ML_{1+4}$ (100° C.)) of 50 to 120, which is synthesized by using a group VIII element catalyst and/or a rare earth element-based catalyst, and (b) a solid isoprene rubber containing no less than 60 wt % of cis-1,4 bonds and having a Mooney viscosity ($ML_{1+4}$ (100° C.)) of 70 to 90, with the ratio of (a) to (b) being from 96/4 to 99/1 by weight;

(B) an unsaturated carboxylic acid and/or a metal salt thereof; and (C) an organic peroxide.

The polybutadiene as component (a) should contain cis-1,4 bonds in an amount no less than 60%, preferably no less than 80%, more preferably no less than 90%, and most desirably no less than 95% ("%" means "wt %" hereinafter). The rubber compound will be poor in rebound resilience if the content of cis-1,4 bonds is excessively small.

Moreover, the polybutadiene as component (a) should contain 1,2-vinyl bonds in an amount no more than 2%, preferably no more than 1.7%, and more preferably no more than 1.5%. The rubber compound will be poor in rebound resilience if the content of 1,2-vinyl bonds is excessively large.

The polybutadiene as component (a) should have a Mooney viscosity ($ML_{1+4}$ (100° C.)) no smaller than 50, preferably no smaller than 51, more preferably no smaller than 52, and most desirably no smaller than 53, and no larger than 120, preferably no larger than 90, more preferably no larger than 80, and most desirably no larger than 70. With an excessively small Mooney viscosity, the resulting rubber compound is poor in rebound resilience and subject to cold flow. With an excessively large Mooney viscosity, the resulting rubber compound is poor in workability.

Incidentally, "Mooney viscosity" used in the present invention is an index of viscosity for industrial use which is measured (according to JIS K6300) with a Mooney viscometer as a rotary plastometer. It is expressed in terms of $ML_{1+4}$ (100° C.), where M stands for Mooney viscosity, L stands for large rotor (L type), 1+4 indicates that duration of preheating is one minute and duration of rotor rotation is four minutes, and 100° C. is the temperature at which measurement is carried out.

The polybutadiene as component (a) should be one which is synthesized by using a group VIII element catalyst and/or a rare earth element-based catalyst.

The group VIII element catalyst is exemplified by nickel-based catalysts and cobalt-based catalysts.

Nickel-based catalysts may be of one-component type (such as nickel diatomaceous earth), of two-component type (such as Raney nickel/titanium tetrachloride), or of three-component type (such as nickel compound/organometallic compound/boron trifluoride etherate). Examples of the nickel compound include supported reduced nickel, Raney nickel, nickel oxide, nickel carboxylate, and organic nickel complex. Examples of the organometallic compound include trialkylaluminum (such as trimethylaluminum, tri-n-propylaluminum, triisobutylaluminum, and tri-n-hexylaluminum), alkyllithium (such as n-butyllithium, sec-butyllithium, tert-butyllithium, and 1,4-dilithiumbutane), and dialkyl zinc (such as diethyl zinc and dibutyl zinc).

The cobalt-based catalyst includes cobalt and its compounds, such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyl dithiocarbamate, cobalt anilinium nitrite, and cobalt dinitrosyl chloride. These cobalt compounds should preferably be used in combination with any of dialkylaluminum monochloride (such as diethylaluminum monochloride and diisobutylaluminum monochloride), trialkylaluminum (such as trimethylaluminum, tri-n-propylaluminum, triisobutylaluminum, and tri-n-hexylaluminum), aluminum alkylsesquichloride (such as ethylaluminum sesquichloride), and aluminum chloride.

Polymerization by using a group VIII element-based catalyst, particularly a nickel or cobalt catalyst (as mentioned above), is usually accomplished in such a way that the reactor is continuously charged with solvent and butadiene monomer together, with the reaction temperature kept at 5 to 60° C. and the reaction pressure kept at normal pressure to about 70 atm. This condition is necessary for the resulting polymer to have the Mooney viscosity specified above.

The rare earth element-based catalyst that can be used for polymerization may be any known one.

Examples of suitable catalysts include lanthanum series rare earth compound, organoaluminum compound, alumoxane, halogen containing compound, optionally in combination with Lewis base.

The lanthanum series rare earth compound includes halides, carboxylates, alcoholates, thioalcoholates, and amides of metals with an atomic number 57 to 71.

The organoaluminum compound includes those which are represented by $AlR^1R^2R^3$ (where $R^1$, $R^2$, and $R^3$ are identical or different groups, each denoting hydrogen or a residue of $C_{1-8}$ hydrocarbon compound).

The almoxane is a compound having the structure represented by the formula (I) or (II) below. It may take on an associated form as described in Fine Chemical 23, (9), 5 (1994), *J. Am. Chem. Soc.*, 115, 4971 (1993), and *J. Am. Chem. Soc.*, 117, 6465 (1995).

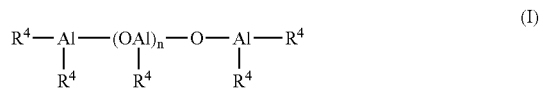

(where, $R^4$ is a $C_{1-20}$ hydrocarbon group and n is an integer of 2 or above.)

The halogen containing compound may be any of aluminum halide, strontium halide, and metal halides. The aluminum halide is a compound represented by $AlX_nR_{3-n}$ (where, X denotes a halogen, R denotes a residue of $C_{1-20}$ hydrocarbon compound, such as alkyl, aryl, and aralkyl, and n is 1, 1.5, 2, or 3). The strontium halide includes $Me_3SrCl$, $Me_2SrCl_2$, $MeSrHCl_2$, and $MeSrCl_3$. The metal halide includes silicon tetrachloride, tin tetrachloride, and titanium tetrachloride.

The Lewis base includes acetylacetone and ketone alcohol, which are used to complex the lanthanum series rare earth compound.

The lanthanum series rare earth compound which is advantageously used as a catalyst in the present invention is a neodymium compound. It is highly active to yield a polybutadiene with a high content of 1,4-cis bonds and a low content of 1,2-vinyl bonds. Examples of this catalyst are given in Japanese Patent Laid-open No. Hei 11-35633.

For the polybutadiene polymerized by using a rare earth element-based catalyst (or lanthanum series rare earth compound) to have the cis content and Mw/Mn ratio as specified above, it is desirable that the amount of butadiene should be 1,000 to 2,000,000 times, particularly 5,000 to 1,000,000 times, the amount of the lanthanum series rare earth compound (in molar ratio). It is also desirable that the molar ratio of $AlR^1R^2R^3$ to the lanthanum series rare earth compound should be from 1 to 1,000, particularly from 3 to 500. It is also desirable that the molar ratio of the halogen compound to the lanthanum series rare earth compound should be from 0.1 to 30, particularly from 0.2 to 15. It is also desirable that the molar ratio of the Lewis base to the lanthanum series rare earth compound should be from 0 to 30, particularly from 1 to 10. Polymerization may be bulk polymerization or vapor phase polymerization with or without solvent. The polymerization temperature is usually from −30° C. to 150° C., preferably from 10° C. to 100° C.

Polymerization of butadiene by using the rare earth element-based catalyst may be either bulk polymerization or vapor phase polymerization with or without solvent. The polymerization temperature is usually from −30° C. to 150° C., preferably from 10° C. to 100° C.

The polybutadiene as component (a) in the present invention may be a modified polybutadiene which is obtained if polymerization by using a rare earth element-based catalyst is followed by reaction of the polymer's active end groups with an end group modifier.

The modified polybutadiene rubber may be obtained by using any of the following seven end group modifiers.

(1) A compound having one or more alkoxysilyl groups, or desirably an alkoxysilane compound having at least one epoxy group or isocyanate group in the molecule. Examples of epoxy group containing alkoxysilane are listed below.

3-glycidyloxypropyltrimethoxysilane,
3-glycidyloxypropyltriethoxysilane,
(3-glycidyloxypropyl)methyldimethoxysilane,
(3-glycidyloxypropyl)methyldiethoxylsilane,
β-(3,4-epoxycyclohexyl)trimethoxysilane,
β-(3,4-epoxycyclohexyl)triethoxysilane,
β-(3,4-epoxycyclohexyl)methyldimethoxysilane,
β-(3,4-epoxycyclohexyl)ethyldimethoxysilane,
condensate of 3-glycidyloxypropyltrimethoxysilane, and
condensate of (3-glycidyloxypropyl)methyldimethoxysilane. Examples of isocyanate group containing alkoxysilane are listed below.

3-isocyanatepropyltrimethoxysilane,
3-isocyanatepropyltriethoxysilane,
(3-isocyanatepropyl)methyldimethoxysilane,
(3-isocyanatepropyl)methyldiethoxysilane,
condensate of 3-isocyanatepropyltrimethoxysilane, and
condensate of (3-isocyanatepropyl)methyldimethoxysilane.

Any of the alkoxysilane compounds listed above may be used in combination with a Lewis acid to enhance its reactivity when it is applied to active end groups. The Lewis acid functions as a catalyst to promote the coupling reaction, so that the resulting modified polymer has improved storage stability with less cold flow. Examples of the Lewis acid include dialkyltin dialkyl malate, dialkyltin dicarboxylate, and aluminum trialkoxide.

(2) Any of halogenated organometallic compounds, metal halide compounds, and organometallic compounds, which are represented by the following formulas.

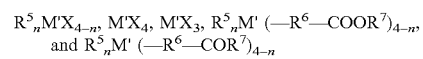

(wherein $R^5$ and $R^6$ are identical or different $C_{1-20}$ hydrocarbon group; $R^7$ is a $C_{1-20}$ hydrocarbon group which may have a carbonyl or ester group in the side chain; M' is a tin atom, silicon atom, germanium atom, or phosphorus atom; X is a halogen atom; and n is an integer of 0 to 3.)

(3) Heterocumulene compound having in the molecule a Y=C=Z bond (where Y is a carbon atom, oxygen atom, nitrogen atom, or sulfur atom; and Z is an oxygen atom, nitrogen atom, or sulfur atom).

(4) Three-membered heterocyclic compound having in the molecule the following bonds.

(where Y is an oxygen atom, nitrogen atom, or sulfur atom).

(5) Halogenated isocyano compounds.

(6) Any of carboxylic acids, acid halides, ester compounds, carboxylic ester compounds, and acid anhydrides, which are represented by the following formulas.

and

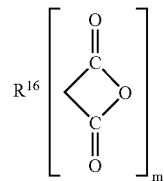

(where, $R^8$ to $R^{16}$ are identical or different $C_{1-50}$ hydrocarbon groups, X is a halogen atom, and m is an integer of 1 to 5.)

(7) Metal carboxylate represented by any of the following formulas. $R^{17}{}_1M''(OCOR^{18})_{4-1}$, $R^{19}{}_1M''(OCO-R^{20}-COOR^{21})_{4-1}$, and

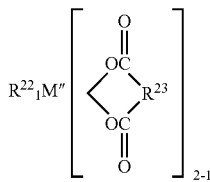

(where, $R^{17}$ to $R^{23}$ are identical or different $C_{1-20}$ hydrocarbon group; M" is a tin atom, silicon atom, or germanium atom; and l is an integer of 0 to 3).

Typical examples and usage of the end group modifiers listed above are shown in Japanese Patent Laid-open Nos. Hei 11-35633, Hei 7-268132, and 2002-29399.

Incidentally, of the catalysts mentioned above, a rare earth element-based catalyst, particularly a Nd-based catalyst, is desirable.

According to the present invention, the polybutadiene mentioned above should have a molecular weight distribution such that the ratio of Mw/Mn (where, Mw denotes a weight-average molecular weight, and Mn denotes a number-average molecular weight) is no smaller than 2.0, preferably no smaller than 2.3, more preferably no smaller than 2.6, and most desirably no smaller than 2.8, and no larger than 8.0, preferably no larger than 6.0, more preferably no larger than 5.0, and most desirably no larger than 4.0. An excessively small ratio leads to poor workability and an excessive large ratio leads to poor rebound resilience.

The polybutadiene used in the present invention should have a solution viscosity η (mPa.s) measured for a 5 wt % toluene solution at 25° C., which is no lower than 300, preferably no lower than 330, more preferably no lower than 360, further preferably no lower than 380, and most desirably no lower than 400, and no higher than 1000, preferably no higher than 800, more preferably no higher than 700, further preferably no higher than 600, and most desirably no higher than 550. An excessively low solution viscosity leads to poor rebound resilience and an excessively high solution viscosity leads to poor workability.

Incidentally, the solution viscosity η (mPa.s) measured for a 5 wt % toluene solution at 25° C. is obtained as follows. A polybutadiene sample (2.28 g) is dissolved in 50 ml of toluene, and the viscosity of the solution is measured by using a prescribed viscometer which has been calibrated with the standard solution according to JIS Z8809.

According to the present invention, the above-mentioned polybutadiene as component (a) is used in combination with the solid isoprene rubber as component (b).

The isoprene rubber should be one which contains cis-1,4 bonds in an amount no less than 60%, preferably no less than 80%, more preferably no less than 90%, and has a Mooney viscosity ($ML_{1+4}$ (100° C.)) no lower than 70, preferably no lower than 75, more preferably no lower than 80, and no higher than 90, preferably no higher than 85. An excessively low content of cis-1,4 bonds leads to poor rebound resilience. An excessively low Mooney viscosity leads to poor rebound resilience, and an excessively high Mooney viscosity reduces the effect of improving workability by addition of the isoprene rubber.

Component (a) and component (b) should be mixed on the weight basis in a ratio (a)/(b) of no lower than 96/4, preferably no lower than 96.5/3.5, and no higher than 99/1, preferably no higher than 98.5/1.5, and more preferably no higher than 98/2. Component (b) in an excessively large amount adversely affects rebound resilience, and component (b) in an excessively small amount hampers the effect of improving workability.

According to the present invention, the, rubber base material is composed of components (a) and (b) mentioned above. However, it may be compounded with optional rubber components without adverse effects on the present invention.

The unsaturated carboxylic acid as component (B) includes acrylic acid, methacrylic acid, maleic acid, and fumaric acid, of which, acrylic acid and methacrylic acid are preferable. The metal salt of the unsaturated carboxylic acid includes zinc salt and magnesium salt, of which zinc acrylate is preferable.

The unsaturated carboxylic acid (or a salt thereof) as component (B) should be added to 100 parts of the rubber base material such that it accounts for no less than 10 parts, preferably no less than 15 parts, more preferably no less than 50 parts, and no more than 60 parts, preferably no more than 50 parts, further preferably no more than 45 parts, most desirably no more than 40 parts. ("Parts" means "parts by weight" hereinafter.)

The organic peroxide as component (C) may be one species, preferably two or more species in combination, selected from known ones. It is desirable to use two or more species of organic peroxide for better rebound resilience. In this case, the one having the shortest half-life at 155° C. is designated as (c) and the one having the longest half-life at 155° C. is designated as (d). If the half-life of (c) is expressed by $c_t$ and the half-life of (d) is expressed by $d_t$, then the ratio of $d_t/c_t$ should be no smaller than 7, preferably no smaller than 8, more preferably no smaller than 9, most desirably no smaller than 10, and no larger than 20, preferably no larger than 18, more preferably no larger than 16, and most desirably no larger than 14. If this requirement is not met, the organic peroxides used in combination will not improve rebound resilience, compression, and durability.

The organic peroxide (c) should have a half-life $c_t$ (at 155° C.) no shorter than 5 seconds, preferably no shorter than 10 seconds, more preferably no shorter than 15 seconds, and no longer than 120 seconds, preferably no longer than 90 seconds, more preferably no longer than 60 seconds. The organic peroxide (d) should have a half-life $d_t$ (at 155° C.) no shorter than 300 seconds, preferably no shorter than 360 seconds, more preferably no shorter than 420 seconds, and no longer than 800 seconds, preferably no longer than 700 seconds, more preferably no longer than 600 seconds.

The organic peroxide includes, for example, dicumyl peroxide, 1,1-bis(t-butylperoxy)-3,5,5-trimethylcyclohexane, and α,α'-bis(t-butylperoxy)diisopropylbenzene. They are commercially available under such trade names as Percumyl D (from NOF Corporation), Perhexa 3M (from NOF Corporation), and Luperco 231XL (from Atochem Co.). The organic peroxide (c) should preferably be 1,1-bis(t-butylperoxy)-3,5,5-trimethylcyclohexane, and the organic peroxide (d) should preferably be dicumyl peroxide.

The organic peroxide as component (C) should be added to 100 parts of component (A) in a total amount of no less than 0.1 part, preferably no less than 0.2 part, more preferably no less than 0.3 part, and most desirably no less than 0.4 part, and no more than 5 parts, preferably no more than 3 parts, more preferably no more than 1 part, most desirably no more than 0.8 part. With an excessively small amount, the rubber compound takes a long time for crosslinking (which leads to low productivity) and the crosslinked product is subject to large compression. With an excessively large amount, the crosslinked product is poor in rebound resilience and durability.

In the case where the organic peroxides (c) and (d) are used in combination, the amount of (c) for 100 parts of component (A) should be no less than 0.05 part, preferably no less than 0.08 part, more preferably no less than 0.1 part, most desirably no less than 0.2 part, and no more than 2.5 parts, preferably no more than 1 part, more preferably no more than 0.5 part, most desirably no more than 0.4 part; and the amount of (d) for 100 parts of component (A) should be no less than 0.05 part, preferably no less than 0.15 part, more preferably no less than 0.2 part, most desirably no less than 0.4 part, and no more than 2.5 parts, preferably no more than 1.5 parts, more preferably no more than 0.7 part, most desirably no more than 0.5 part.

The rubber compound of the present invention should preferably be compounded with an organosulfur compound as component (D).

The organosulfur compound as component (D) includes thiophenols, thionaphthols, halogenated thiophenols, and metal salts thereof, and polysulfides having 2 to 4 sulfurs. Their typical examples include pentachlorothiophenol, pentafluorothiophenol, pentabromothiophenol, p-chlorothiophenol, and zinc salts thereof, polysulfides having 2 to 4 sulfur atoms (such as diphenylpolysulfide, dibenzylpolysulfide, dibenzoylpolysulfide, dibenzothiazoylpolysulfide, dithiobenzoylpolysulfide, and alkylphenyldisulfide), sulfur compounds having a furan ring, and sulfur compounds having a thiophene ring. Of these examples, zinc salt of pentachlorothiophenol and phenyldisulfide are preferable.

The amount of the organosulfur compound as component (D) for 100 parts of the rubber base material as component (A) should be no less than 0.1 part, preferably no less than 0.2 part, more preferably no less than 0.4 part, most desirably no less than 0.6 part, and no more than 5 parts, preferably no more than 4 parts, more preferably no more than 3 parts, most desirably no more than 2 parts. With an excessively small amount, it does not produce the effect of improving rebound resilience. With an excessively large amount, it does not provide sufficient rebound resilience due to excessively low hardness.

The rubber compound may be additionally compounded with an organic filler as component (E).

The inorganic filler as component (E) includes zinc oxide, barium sulfate, and calcium carbonate. The amount of the inorganic filler for 100 parts of component (A) should be no less than 1 part, preferably no less than 3 parts, more preferably no less than 5 parts, most desirably no less than 7 parts, and no more than 130 parts, preferably no more than 50 parts, more preferably no more than 45 parts, most desirably no more than 40 parts. With an excessively large or small amount, the inorganic filler does not provide an adequate weight and good rebound resilience.

The rubber compound may optionally be compounded with an antioxidant. The amount of the antioxidant for 100 parts of component (A) should be no less than 0 part, preferably no less than 0.05 part, more preferably no less than 0.1 part, most desirably no less than 0.2 part, and no more than 3 parts, preferably no more than 2 parts, more preferably no more than 1 parts, most desirably no more than 0.5 part. The antioxidant may be selected from commercial ones, such as Nocrac NS-6, Nocrac NS-30 (both from Ouchi Shinko Chemical Industry Co., Ltd.), and Yoshinox 425 (from Yoshitomi Pharmaceutical Industries, Ltd.).

The rubber compound mentioned above may be vulcanized and cured in the same way as the known rubber compound for golf balls. Vulcanization will take 10 to 40 minutes at 100 to 200° C.

The golf ball according to the present invention is made up of the crosslinked product obtained from the rubber compound mentioned above. The type of the golf ball is not specifically restricted. It may be a one-piece solid golf ball, which is formed entirely from the crosslinked product. It may be a two-piece solid golf ball consisting of a solid core and a cover layer formed thereon. The solid core is formed from the crosslinked product. It may be a multi-piece solid golf ball (or three-piece golf ball) consisting of a solid core and two or more cover layers. The solid core is formed from the crosslinked product. It may be a wound golf ball having a center core which is formed from the crosslinked product. Two-piece and multi-piece solid golf balls, in which the solid core is formed from the crosslinked product of the present invention, are desirable from the standpoint of good extrudability, good vulcanizability, and good rebound resilience.

The crosslinked product mentioned above may be formed into one-piece solid golf balls, solid cores, or solid centers in any manner such that they are uniform or varied in hardness across their cross section.

The one-piece solid golf balls, solid cores, or solid centers should have adequate stiffness so that their deflection under a load of 980 N (100 kg) is usually no less than 2.0 mm, preferably no less than 2.5 mm, more preferably no less than 2.8 mm, most desirably no less than 3.2 mm, and no more than 6.0 mm, preferably no more than 5.5 mm, more preferably no more than 5.0 mm, most desirably no more than 4.5 mm. An excessively small deflection leads to an unpleasant shot feel and a short flying distance due to deformation and extreme spin caused by a driver shot. An excessively large deflection not only leads to a dull shot feel and an insufficient rebound resilience (which in turn leads to a short flying distance) but also adversely effects resistance to cracking caused by repeated shots.

The solid core should have a diameter no smaller than 30.0 mm, preferably no smaller than 32.0 mm, more preferably no smaller than 35.0 mm, most desirably no smaller than 37.0 mm, and no larger than 41.0 mm, preferably no larger than 40.5 mm, more preferably no larger than 40.0 mm, most desirably no larger than 39.5 mm. Particularly, the solid core for two-piece solid golf balls should have a diameter no smaller than 37.0 mm, preferably no smaller than 37.5 mm, more preferably no smaller than 38.0 mm, most desirably no smaller than 38.5 mm, and no larger than 41.0 mm, preferably no larger than 40.5 mm, more preferably no larger than 40.0 mm. The solid core for three-piece solid golf balls should have a diameter no smaller than 30.0 mm, preferably no smaller than 32.0 mm, more preferably no smaller than 34.0 mm, most desirably no smaller than 35.0 mm, and no larger than 40.0 mm, preferably no larger than 39.5 mm, more preferably no larger than 39.0 mm.

The solid core should have a specific gravity no lower than 0.9, preferably no lower than 1.0, more preferably no lower than 1.1, and no higher than 1.4, preferably no higher than 1.3, more preferably no higher than 1.2.

In the case where the present invention is applied to two-piece solid golf balls or multi-piece solid golf balls, the solid core is made from the crosslinked product mentioned above and the solid core is enclosed with any known cover material and intermediate layer material by injection molding or pressure molding.

The cover material or intermediate layer material should be based on a polyurethane elastomer (thermoplastic or thermosetting), polyester elastomer, ionomer resin, or polyolefin elastomer, or a mixture thereof. They may be used alone or in combination with one another. Of these materials, thermoplastic polyurethane elastomers and ionomer resins are preferable.

The thermoplastic polyurethane elastomer mentioned above is commercially available as exemplified below. Pandex T7298, Pandex T7295, Pandex T7890, Pandex TR3080, Pandex T8295, and Pandex T8290 (all from DIC Bayer Polymer, Ltd.), which are produced from an aliphatic or aromatic diisocyanate.

The ionomer resin mentioned above is commercially available as exemplified below. Surlyn 6320 and Surlyn 8120 (both from E.I. du Pont de Nemours and Co., Inc.), and Himilan 1706, Himilan 1605, Himilan 1855, Himilan 1601, Himilan 1557 (all from DuPont-Mitsui Polychemicals Co., Ltd.).

In addition, the cover material or intermediate layer material may optionally be compounded with a thermoplastic elastomer or polymer (excluding those mentioned above), such as polyamide elastomer, styrene block elastomer, hydrogenated polybutadiene, and ethylene-vinyl acetate (EVA) copolymer.

The two-piece solid golf ball or multi-piece solid golf ball according to the present invention may be produced by any known method without specific restrictions. A preferred method for two-piece or multi-piece solid golf balls consists of placing the solid core (formed from the crosslinked product mentioned above) in the injection mold and forming the cover layer (in the case of two-piece solid golf ball) or forming the intermediate layers and cover layer (in the case of multi-piece solid golf ball) by injection molding. In some cases, the cover layer may be formed by pressure molding.

The intermediate layer of the multi-piece solid golf ball should have a thickness no smaller than 0.5 mm, preferably no smaller than 1.0 mm, and no larger than 3.0 mm, preferably no larger than 2.5 mm, more preferably no larger than 2.0 mm, most desirably no larger than 1.6 mm.

The cover layer of both the two-piece solid golf ball and the multi-piece solid golf ball should have a thickness no smaller than 0.7 mm, preferably no smaller than 1.0 mm, and no larger than 3.0 mm, preferably no larger than 2.5 mm, more preferably no larger than 2.0 mm, most desirably no larger than 1.6 mm.

The golf ball according to the present invention should conform to the rules for competition, which state that the diameter should be no smaller than 42.67 mm and the weight should be no more than 45.93 g. The upper limit of the diameter should preferably be no larger than 44.0 mm, more preferably no larger than 43.5 mm, most desirably no larger than 43.0 mm. The lower limit of the weight should preferably be no less than 44.5 g, more preferably no less than 45.0 g, further preferably no less than 45.1 g, most desirably no less than 45.2 g.

The golf ball according to the present invention permits production with good workability and exhibits excellent rebound resilience.

EXAMPLES

The invention will be described in more detail with reference to the following examples and comparative examples, which are not intended to restrict the scope thereof.

Examples 1 to 3 and Comparative Examples 1 to 5

A rubber compound was prepared from polybutadiene rubber (BR) and isoprene rubber (IR) as shown in Table 1. This rubber compound was made into a core of a two-piece solid golf ball by vulcanization at 155° C. for 20 minutes. The core measures 38.9 mm in diameter and weighs 36.0 g. This core was covered with a 1:1 mixture (by weight) of Himilan 1601 and Himilan 1557 by injection molding which forms dimples in the surface. After surface coating with paint, there was obtained a two-piece solid golf ball measuring 42.7 mm in diameter and weighing 45.3 g.

The core was tested for deflection under a load of 100 kg (980 N) and rebound resilience in the following manner. The golf ball was examined for extrudability and flying performance in the following manner. The results are shown in Table 2.

Examples 4 and 5 and Comparative Examples 6 and 7

A rubber compound was prepared according to the formulation shown in Table 3. This rubber compound was vulcanized at 170° C. for 30 minutes to make a one-piece solid golf ball, which measures 42.7 mm in diameter and weighs 45.3 g. The results of evaluation are shown in Table 3.

Deflection Under a Load of 100 kg

The solid core was tested for deflection (mm) under a load of 100 kg (980 N).

Rebound Resilience

Rebound resilience was evaluated by measuring the initial velocity with an apparatus of the same type as approved by USGA (United States Golf Association). In Examples 1 to 3 and Comparative Examples 1 to 5, the results are expressed in terms of difference from the initial velocity (as the standard) in Comparative Example 2. In Examples 4 and 5 and Comparative Examples 6 and 7, the results are expressed in terms of difference from the initial velocity (as the standard) in Comparative Example 6.

Extrusion Workability

The extruded slug was examined for surface texture and shape, and the result was rated according to the following criterion.

4: very smooth surface texture
3: slightly rough surface texture
2: fuzzy surface texture, extrudable
1: irregular shape, not extrudable Flying Performance Flying performance was evaluated by shooting the golf ball at a head speed of 45 m/s with a driver (W#1, Tour Stage X500, loft 9°, shaft X, made by Bridgestone Sports) operated by a shooting machine.

TABLE 1

| Kind | | Maker | Catalyst | Content of cis-1,4 bonds (wt %) | Content of 1,2-vinyl bonds (wt %) | Mooney viscosity (ML$_{1+4}$ (100° C.)) | Mw/Mn | η (mPa·s) |
|---|---|---|---|---|---|---|---|---|
| BR | BR 01 | JSR | Ni | 96 | 2.5 | 44 | 4.2 | 150 |
| | BR 18 | | Ni | 96 | 2 | 60 | 4.2 | 590 |
| | HCBN-13 | | Nd | 96 | 1.3 | 54 | 3.2 | 475 |
| | CNB 700 | | Nd | 96.2 | 1.3 | 43 | 2.8 | 280 |
| IR | IR 309 | Shell | | 92 | | 45 | | |
| | IR 2200 | JSR | | 98 | | 82 | | |

TABLE 2

| | | | Example | | | Comparative Example | | | | |
|---|---|---|---|---|---|---|---|---|---|---|
| | | | 1 | 2 | 3 | 1 | 2 | 3 | 4 | 5 |
| Core Formulation (parts by weight) | BR | BR 01 | | | | | 90 | | | |
| | | BR 18 | | | | | | | | 90 |
| | | HCBN-13 | 97 | 98 | 98 | 100 | | 90 | | |
| | | CNB 700 | | | | | | | 90 | |
| | IR | IR 309 | | | | | | | 10 | |
| | | IR 2200 | 3 | 2 | 1 | | 10 | 10 | | 10 |
| | (a) Perhexa 3M-40*[1] | Amount | 0.3 | 0.3 | 0.3 | 0.3 | 0.6 | 0.3 | 0.3 | 0 |
| | | Actual | 0.12 | 0.12 | 0.12 | 0.12 | 0.24 | 0.12 | 0.12 | 0 |
| | (b) Percumyl D*[2] | | 0.3 | 0.3 | 0.3 | 0.3 | 0.6 | 0.3 | 0.3 | 2 |
| | Zinc oxide | | 19 | 19 | 19 | 19 | 19.5 | 19 | 19 | 17 |
| | Antioxidant | | 0.1 | 0.1 | 0.1 | 0.1 | 0.1 | 0.1 | 0.1 | 0.1 |
| | Zinc acrylate | | 30 | 30 | 30 | 30 | 28 | 30 | 30 | 35 |
| | Zinc salt of pentachlorothiophenol | | 0.6 | 0.6 | 0.6 | 0.6 | 0.6 | 0.6 | 0.6 | 0 |
| Core performance | Deflection under a load of 100 kg (mm) | | 2.9 | 2.9 | 2.9 | 2.9 | 3.1 | 2.9 | 2.9 | 2.3 |
| | Rebound resilience (m/s) | | +0.6 | +0.6 | +0.6 | +0.6 | ±0 | +0.4 | +0.3 | −0.3 |
| | Extrusion workability | | 3 | 3 | 2 | 1 | 4 | 3 | 4 | 3 |
| Flying performance | #W1 HS 45 | Carry (m) | 217.2 | 217.1 | 217.0 | 217.1 | 211.0 | 215.2 | 213.9 | 207.1 |
| | | Total (m) | 232.9 | 233.0 | 232.9 | 232.9 | 226.5 | 230.4 | 229.6 | 222.1 |

Remarks:
*[1]Half-life = 40 seconds,
*[2]Half-life = 480 seconds.
Perhexa 3M-40 is a 40% diluted product.
(The actual amount is calculated on the assumption that 3M-40 is 100%.)
Note to Table 2
Comparative Example 1: The sample was good in rebound resilience but was very poor in workability because it was formed from BR alone which was polymerized by using a Ni-based catalyst.
Comparative Example 2: The sample was poor in rebound resilience because it was formed from low-rebound BR which was polymerized by using a Ni-based catalyst.
Comparative Example 3: The sample was poor in rebound resilience because it contained IR in a large amount.
Comparative Example 4: The sample was poor in rebound resilience because it was formed from low-Mooney BR which was polymerized by using a Ni-based catalyst.
Comparative Example 5: The sample was poor in rebound resilience because it was formed from a rubber compound which lacked single peroxide and zinc salt of pentachlorothiophenol.

TABLE 3

| | | | Example | | Comparative Example | | | | | Example | | Comparative Example | |
|---|---|---|---|---|---|---|---|---|---|---|---|---|---|
| | | | 4 | 5 | 6 | 7 | | | | 4 | 5 | 6 | 7 |
| Formulation for core (parts by weight) | BR | BR 01 | | | 95 | | | Performance of core | Deflection under a load of 100 kg (mm) | 2.7 | 2.7 | 2.7 | 2.7 |
| | | HCBN-13 | 97 | 98 | | 80 | | | | | | | |
| | IR | IR 2200 | 3 | 2 | 5 | 20 | | | | | | | |
| | Percumyl D | | 0.7 | 0.7 | 1.0 | 1.0 | | | Rebound resilience (m/s) | +0.4 | +0.4 | ±0 | −0.3 |
| | Zinc oxide | | 23 | 23 | 23 | 23 | | | | | | | |
| | Antioxidant | | 0.2 | 0.2 | 0.2 | 0.2 | | | | | | | |
| | Methacrylic acid | | 23 | 23 | 23 | 23 | | | Extrusion workability | 3 | 3 | 3 | 4 |
| | Titanium oxide | | 1 | 1 | 1 | 1 | | | | | | | |

TABLE 3-continued

| | | | Example | | Comparative Example | |
|---|---|---|---|---|---|---|
| | | | 4 | 5 | 6 | 7 |
| Flying performance | #W1 HS 45 | Carry (m) Total (m) | 203.0 218.2 | 202.7 218.5 | 199.5 212.3 | 197.9 210.1 |

Note to Table 3
Comparative Example 6: The sample was poor in rebound resilience because it was formed from low-rebound BR which was polymerized by using a Ni-based catalyst.
Comparative Example 7: The sample was poor in rebound resilience because it contained IR in a large amount.

The invention claimed is:

1. A golf ball which is formed from a crosslinked rubber compound composed of, as essential components,
   (A) a rubber base material composed of (a) a polybutadiene containing no less than 60 wt % of cis-1,4 bonds and having a Mooney viscosity ($ML_{1+4}$ (100° C.)) of 50 to 120, which is synthesized by using a group VIII element catalyst and/or a rare earth element-based catalyst, and (b) a solid isoprene rubber containing no less than 60 wt % of cis-1,4 bonds and having a Mooney viscosity ($ML_{1+4}$ (100° C.)) of 70 to 90, with the ratio of (a) to (b) being from 96/4 to 99/1 by weight;
   (B) an unsaturated carboxylic acid and/or a metal salt thereof; and
   (C) an organic peroxide.

2. The golf ball of claim 1, wherein the polybutadiene has a molecular weight distribution Mw/Mn of 2.0 to 8.0, where Mw denotes a weight-average molecular weight and Mn denotes a number-average molecular weight.

3. The golf ball of claim 1, wherein the polybutadiene has a solution viscosity η (mPa.s) of 300 to 1000 measured for a 5 wt % toluene solution at 25° C.

4. The golf ball of claim 1, wherein the rubber compound additionally contains 0.1 to 5 parts by weight of an organosulfur compound for 100 parts by weight of the rubber base material.

5. The golf ball of claim 1, wherein the organic peroxide is composed of two or more species of organic peroxides which are specified by their half-life such that the ratio of $d_t/c_t$ is 7 to 20, where $c_t$ denotes the half-life of an organic peroxide (c) having the shortest half-life and $d_t$ denotes the half-life of an organic peroxide (d) having the longest half-life, with the total amount of these organic peroxides being 0.1 to 5 parts by weight for 100 parts by weight of the rubber base material.

6. The golf ball of claim 1, which is a one-piece golf ball or a golf ball having a solid core or a solid center, wherein the crosslinked product of the rubber compound constitutes the one-piece solid golf ball or the solid core or solid center, and the one-piece solid golf ball or the solid core or solid center undergoes a deflection of 2.0 to 6.0 mm under a load of 980 N (100 kg).

* * * * *